(12) United States Patent
Gubrinski et al.

(10) Patent No.: US 11,555,158 B2
(45) Date of Patent: Jan. 17, 2023

(54) PROCESS AND PLANT FOR PRODUCING A PLURALITY OF GAS PRODUCTS FROM SHIFTED AND UNSHIFTED CRUDE SYNTHESIS GAS

(71) Applicant: L'Air Liquide, Société Anonyme pour l'Etude et l'Exploitation des Procédés Georges Claude, Paris (FR)

(72) Inventors: Alfred Gubrinski, Frankfurt am Main (DE); Pankaj Puri, Cracow (PL); Sharon Corbet, Frankfurt (DE); Dorit Rappold, Frankfurt (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 39 days.

(21) Appl. No.: 17/253,509

(22) PCT Filed: May 29, 2019

(86) PCT No.: PCT/EP2019/025160
§ 371 (c)(1),
(2) Date: Dec. 17, 2020

(87) PCT Pub. No.: WO2019/242884
PCT Pub. Date: Dec. 26, 2019

(65) Prior Publication Data
US 2021/0269728 A1    Sep. 2, 2021

(30) Foreign Application Priority Data
Jun. 18, 2018  (EP) ................................. 18400020

(51) Int. Cl.
*C10K 1/16* (2006.01)
*B01D 53/14* (2006.01)
*B01D 53/18* (2006.01)
*C01B 3/50* (2006.01)
*C01B 3/52* (2006.01)
*C01B 17/16* (2006.01)
*C10K 1/08* (2006.01)
*C01B 32/50* (2017.01)
*C10K 1/00* (2006.01)

(52) U.S. Cl.
CPC ............ *C10K 1/16* (2013.01); *B01D 53/1406* (2013.01); *B01D 53/1418* (2013.01);
(Continued)

(58) Field of Classification Search
None
See application file for complete search history.

(56) References Cited

U.S. PATENT DOCUMENTS

| 5,067,972 A | 11/1991 | Hemmings et al. |
| 2007/0129450 A1 | 6/2007 | Barnicki et al. |
| 2013/0327990 A1 | 12/2013 | Mak |

OTHER PUBLICATIONS

Chemcad, Power plant carbon capture with Chemcad, Nov. 3, 2009, 1-26, retrieved from the internet at https://www.chemstations.com/content/documents/Technical_Articles/Power_Plant_Carbon_Capture_with_CHEMCAD.pdf (retrieved on Nov. 16, 2020).

(Continued)

Primary Examiner — Daniel Berns
(74) Attorney, Agent, or Firm — Elwood L. Haynes

(57) ABSTRACT

The invention relates to a gas scrubbing process and a corresponding plant for removal of acidic gas constituents from crude synthesis gas which make it possible by treatment of shifted and of unshifted crude synthesis gas in the gas scrubbing process and by combination of the thus-obtained partial product streams to produce a plurality of gas products having different compositions. In addition, the invention ensures that the flash gases obtained during decompression of the laden scrubbing medium are utilized materially and/or energetically in advantageous fashion.

7 Claims, 2 Drawing Sheets

(52) U.S. Cl.
CPC ..... *B01D 53/1425* (2013.01); *B01D 53/1462* (2013.01); *B01D 53/18* (2013.01); *C01B 3/52* (2013.01); *C01B 32/50* (2017.08); *C10K 1/004* (2013.01); *C10K 1/005* (2013.01); *C10K 1/006* (2013.01); *B01D 2252/2021* (2013.01); *C01B 2203/048* (2013.01); *C01B 2203/0475* (2013.01); *C01B 2203/0485* (2013.01); *C01B 2203/061* (2013.01)

(56) References Cited

OTHER PUBLICATIONS

Gatti, M. et al., Multi-objective optimization of a Selexol® process for the selective removal of $CO_2$ and $H_2S$ from a coal-derived syngas, Proceedings of ECOS 2015—The 28th International Conference on Efficiency, Cost Optimization, Simulation and Environmental Impact of Energy Systems, Jul. 3, 2015, 1-13, retrieved from the internet at https://www.researchgate.net/publication/280304692_Multi-objective_Optimization_of_a_SelexolR_Process_for_the_Selective_Removal_of_CO2_and_H2S_from_Coal-drived_Syngas (retrieved on Nov. 16, 2020).

Kapetaki, Z. et al., Process simulation of a dual-stage Selexol process for 95% carbon capture efficiency at an integrated gasification combined cycle power plant, International Journal of Greenhouse Gas Control 39 (2015), 17-26.

Ullmann's Encyclopedia of Industrial Chemistry, 6th ed. vol. 15, Gas Production, 5.1 Carbon monoxide shift conversion, 382-387.

Ullmann's Encyclopedia of Industrial Chemistry, 6th ed. vol. 15, Gas Production, 5.4.2.1 Physical absorption processes, 399-407.

International Search Report and Written Opinion for corresponding PCT/EP2019/025160, dated Sep. 10, 2019.

PROCESS AND PLANT FOR PRODUCING A PLURALITY OF GAS PRODUCTS FROM SHIFTED AND UNSHIFTED CRUDE SYNTHESIS GAS

CROSS REFERENCE TO RELATED APPLICATIONS

This application is a 371 of International Application No. PCT/EP2019/025160, filed May 29, 2019, which claims priority to European Patent Application No. 18400020.6, filed Jun. 18, 2018, the entire contents of which are incorporated herein by reference.

BACKGROUND

Field of the Invention

The invention relates to a process for producing a plurality of gas products having different compositions from crude synthesis gas by gas scrubbing with a scrubbing medium and subsequent combination of individual gas streams thus obtained. The invention further relates to a plant for performing such a process.

Prior Art

Processes for separation of undesired concomitants from industrial crude gases by physical or chemical absorption or gas scrubbing are well-known from the prior art. Thus such processes may be used to safely remove down to trace amounts unwanted, acidic constituents of crude synthesis gases produced by gasification or reforming of carbon-containing inputs, for example carbon dioxide ($CO_2$) and hydrogen sulfide ($H_2S$) but also further constituents such as carbonyl sulfide (COS) and hydrogen cyanide (HCN), from the wanted synthesis gas constituents hydrogen ($H_2$) and carbon monoxide (CO), A known and often employed process is the Rectisol process which is described in principle in Ullmann's Encyclopedia of Industrial Chemistry, 6th Ed. Vol. 15, p 399 et seq. In the Rectisol process the abovementioned unwanted disruptive components are absorbed by cold methanol, i.e. methanol cooled significantly below ambient temperature, as an absorbent or scrubbing medium, wherein intensive mass transfer between the crude gas and the absorption medium/scrubbing medium takes place in an absorber column also known as a scrubbing column. The solubility of the unwanted gas constituents increases drastically with decreasing temperature of the methanol and increasing pressure while remaining practically constant for hydrogen and carbon monoxide. Methanol additionally has the advantage of retaining a low viscosity and thus good mass and heat transfer properties even at temperatures down to −75° C.

The methanol laden with the disruptive components and used as scrubbing medium is circulated through regeneration apparatuses in the Rectisol process. In the regeneration apparatuses the laden methanol is freed from the absorbed gases by physical means. Thus in a first regeneration step $CO_2$ is removed from the laden methanol scrubbing medium by decompression (so-called flash regeneration) and/or stripping with a gas, for example nitrogen. In a further or alternative regeneration step the sulfur-containing gases, COS and $H_2S$, are driven off by heating (so-called hot regeneration). It is often sought to produce a virtually $CO_2$-free COS/$H_2S$ gas since economic further processing thereof is impaired by mixing with $CO_2$.

In the Rectisol process a distinction is made between the standard process and the selective Rectisol process. In the standard Rectisol process the concomitant gases COS/$H_2S$ and the $CO_2$ are removed from the crude synthesis gas together in one absorption step. By contrast, in the so-called selective Rectisol process the sulfur-containing concomitant gases COS/$H_2S$ and the $CO_2$ are respectively removed from the crude synthesis gas in separate consecutive absorption steps. This selective absorption is achieved by suitable adjustment of the process parameters, in particular the quantity ratio of scrubbing medium and gas to be absorbed. The advantage of selective absorption is that the COS/$H_2S$ and the $CO_2$ gas are already kept very largely separate in the absorption and only the smaller portion requires separation during the regeneration of the methanol. This also allows for recovery of the sulfur present using downstream processes such as for example the Claus process.

Flash regeneration of the scrubbing medium laden with acidic gas constituents may be carried out in a multi-stage procedure, wherein mechanical work and refrigeration can be recovered in the decompression. Thus, in a process for removal of acidic constituents such as $CO_2$, $H_2S$ and COS from a gas stream U.S. Pat. No. 5,067,972 proposes treating said stream with a physical scrubbing medium. The scrubbing medium laden with the acidic gas constituents is supplied to a cascade of flash vessels of incrementally decreasing pressure and the flash gases thus liberated are supplied between two stages of a multi-stage decompression turbine in each case. This recovers mechanical work and process refrigeration.

However, the flash gas obtained at the end of the decompression cascade is used merely as coolant for the crude gas introduced into the process and is then discharged from the process. One disadvantage of this is that no further utilization, for example utilization as material, of the flash gases obtained is taught.

A further disadvantage is that the described gas purification processes recover a pure synthesis gas of fixed composition. CO conversion (also known as a CO shift) may be used to after the composition in the direction of mixtures richer in hydrogen after addition of steam and contacting with a suitable catalyst as is described in Ullmann's Encyclopedia of Industrial Chemistry, 6th Ed. Vol. 15, Chapter 5.1 "Carbon monoxide shift conversion", p 382 et seq. However, since the pure synthesis gas is generally obtained at a temperature near ambient temperature after passing through the scrubbing process, performance of the CO conversion generally requires a reheating of the pure synthesis gas. This requires additional devices such as heaters/heat exchangers and the corresponding heating energy withdrawn from the crude synthesis gas during cooling prior to introduction into the scrubbing apparatus must be resupplied.

SUMMARY

The problem addressed by the invention is accordingly that of specifying a process which avoids the recited disadvantages of the processes known from the prior art and which makes it possible in particular to recover a plurality of pure gas products having different compositions, for example in respect of the $H_2$/CO ratio present in the different partial products, from the crude synthesis gas.

This problem is solved substantially by a process having the features of Claim 1. Further embodiments, in particular preferred embodiments, of the process according to the invention may be found in the dependent claims. The invention further relates to a plant for performing such a process.

Process According to the Invention

Process for purifying a shifted crude synthesis gas and an unshifted crude synthesis gas by gas scrubbing with a scrubbing medium and for producing a plurality of synthesis gas product streams having different $H_2/CO$ ratios comprising the steps of:

(a) providing and supplying the shifted crude synthesis gas and the unshifted crude synthesis gas to respective separate prescrubbers for removal of trace components such as $NH_3$, HCN, mercaptans, BTX aromatics, (b) supplying the gaseous tops products from the prescrubbers to respective separate $H_2S$ scrubbers for removal of $H_2S$, (c) supplying the gaseous tops products from the $H_2S$ scrubbers to respective separate $CO_2$ scrubbers for removal of $CO_2$, (d1) dividing the gaseous tops product stream from the $CO_2$ scrubber for the unshifted crude synthesis gas into a first synthesis gas partial product stream and into a second synthesis gas partial product stream which for pressure reduction is passed through a preferably multi-stage expander to recover mechanical work and refrigeration and to obtain an expanded second synthesis gas partial product stream, (d2) dividing the gaseous tops product stream from the $CO_2$ scrubber for the shifted crude synthesis gas into a third synthesis gas partial product stream and into a fourth synthesis gas partial product stream, (e) supplying the liquid bottoms products from the separate prescrubbers to an intermediate-pressure prescrubbing flash vessel, supplying the gaseous tops product from the intermediate-pressure prescrubbing flash vessel to a recompressor, supplying the liquid bottoms product from the intermediate-pressure prescrubbing flash vessel to a low-pressure prescrubbing flash vessel, supplying the gaseous tops product from the low-pressure prescrubbing flash vessel to the recompressor, supplying the liquid bottoms product from the low-pressure prescrubbing flash vessel to at least one apparatus for flash regeneration and/or hot regeneration of the scrubbing medium, (f) supplying the liquid bottoms products from the separate $H_2S$ scrubbers to an intermediate-pressure $H_2S$ flash vessel, supplying the gaseous tops product from the intermediate-pressure $H_2S$ flash vessel to the recompressor, supplying the liquid bottoms product from the intermediate-pressure $H_2S$ flash vessel to a low-pressure $H_2S$ flash vessel, supplying the gaseous tops product from the low-pressure $H_2S$ flash vessel to the recompressor, supplying the liquid bottoms product from the low-pressure $H_2S$ flash vessel to at least one apparatus for flash regeneration and/or hot regeneration of the scrubbing medium, (g) supplying the liquid bottoms products from the separate $CO_2$ scrubbers to an intermediate-pressure $CO_2$ flash vessel, supplying the gaseous tops product from the intermediate-pressure $CO_2$ flash vessel to the recompressor, supplying the liquid bottoms product from the intermediate-pressure $CO_2$ flash vessel to a low-pressure $CO_2$ flash vessel, supplying the gaseous tops product from the low-pressure $CO_2$ flash vessel to the low-pressure $H_2S$ flash vessel and/or to the recompressor, supplying the liquid bottoms product from the low-pressure $CO_2$ flash vessel to at least one apparatus for flash regeneration and/or hot regeneration of the scrubbing medium, (h) recycling the gas stream compressed by the recompressor to the prescrubber for the unshifted crude synthesis gas and/or the shifted crude synthesis gas.

Plant According to the Invention

Plant for purifying a shifted crude synthesis gas and an unshifted crude synthesis gas by gas scrubbing with a scrubbing medium and for producing a plurality of synthesis gas product streams having different $H_2/CO$ ratios comprising the following constituents and assemblies in fluid connection with one another:

(a) means for providing and supplying the shifted crude synthesis gas and the unshifted crude synthesis gas to respective separate prescrubbers, wherein the pre-scrubbers are suitable for removal of trace components such as $NH_3$, HCN, mercaptans, BTX aromatics, (b) means for supplying the gaseous tops products from the prescrubbers to respective separate $H_2S$ scrubbers for removal of $H_2S$, (c) means for supplying the gaseous tops products from the $H_2S$ scrubbers to respective separate $CO_2$ scrubbers for removal of $CO_2$, (d1) means for dividing the gaseous tops product stream from the $CO_2$ scrubber for the unshifted crude synthesis gas into a first partial product stream and into a second partial product stream, means for introducing the second partial product stream into a multi-stage expander, means for discharging the expanded second partial product stream from the expander, (d2) means for dividing the gaseous tops product stream from the $CO_2$ scrubber for the shifted crude synthesis gas into a third partial product stream and into a fourth partial product stream, (e) means for supplying the liquid bottoms products from the separate pre-scrubbers to an intermediate-pressure pre-scrubbing flash vessel, means for supplying the gaseous tops product from the intermediate-pressure prescrubbing flash vessel to a recompressor, means for supplying the liquid bottoms product from the intermediate-pressure prescrubbing flash vessel to a low-pressure prescrubbing flash vessel, means for supplying the gaseous tops product from the low-pressure prescrubbing flash vessel to the recompressor, means for supplying the liquid bottoms product from the low-pressure prescrubbing flash vessel to at least one apparatus for flash regeneration and/or hot regeneration of the scrubbing medium, (f) means for supplying the liquid bottoms products from the separate $H_2S$ scrubbers to an intermediate-pressure $H_2S$ flash vessel, means for supplying the gaseous tops product from the intermediate-pressure $H_2S$ flash vessel to the recompressor, means for supplying the liquid bottoms product from the intermediate-pressure $H_2S$ flash vessel to a low-pressure $H_2S$ flash vessel, means for supplying the gaseous tops product from the low-pressure $H_2S$ flash vessel to the recompressor, means for supplying the liquid bottoms product from the low-pressure $H_2S$ flash vessel to at least one apparatus for flash regeneration and/or hot regeneration of the scrubbing medium, (g) means for supplying the liquid bottoms products from the separate $CO_2$ scrubbers to an intermediate-pressure $CO_2$ flash vessel, means for supplying the gaseous tops product from the intermediate-pressure $CO_2$ flash vessel to the recompressor, means for supplying the liquid bottoms product from the intermediate-pressure $CO_2$ flash vessel to a low-pressure $CO_2$ flash vessel, means for supplying the gaseous tops product from the low-pressure $CO_2$ flash vessel to the low-pressure $H_2S$ flash vessel and/or to the recompressor, means for supplying the liquid bottoms product from the low-pressure $CO_2$ flash vessel to at least one apparatus for flash regeneration and/or for hot regeneration of the scrubbing medium, (h) means for recycling the gas stream compressed by the recompressor to the prescrubber for the unshifted crude synthesis gas and/or the shifted crude synthesis gas.

The terms shifted synthesis gas and unshifted synthesis gas are to be understood as meaning a synthesis gas that has been subjected to CO conversion and a synthesis gas that has not been subjected to CO conversion respectively. The reaction conditions required for performing CO conversion are known to those skilled in the art and are described in the technical literature.

The term scrubbing medium, synonymous with absorption medium or solvent, is in the context of the present invention to be understood as meaning substances or substance mixtures which under process conditions are in the form of a liquid, have an absorption capacity for the components to be separated from the gas and may be regenerated by physical methods, for example by flashing or by hot regeneration.

Flashing is to be understood as meaning a rapid, preferably abrupt, decompression of a liquid which is preferably effected upon entering a vessel via a flow limiter, for example a valve. The gases thus liberated are referred to as flash gases.

The term recompressor refers to a single-stage or multi-stage compressor having the task of increasing the pressure of a gas stream from a low value to a higher value, for example the entry pressure of the crude synthesis gas.

The supplying of a material stream to the expander also comprises the at least partial supplying thereof while the remainder of the material stream is for example passed to the recompressor.

The prescrubber, the $H_2S$ scrubber and the $CO_2$ scrubber need not necessarily be in the form of separate devices connected via conduits but in the context of the present invention may also be sections of one or more integrated absorption columns.

In the recycling of the gas stream compressed by the recompressor to the prescrubber for the crude synthesis gas the gas stream may be passed directly into the prescrubber via a separate conduit. The recycle conduit may alternatively open into the crude synthesis gas feed conduit to bring about a premixing of the recycled gas with the crude synthesis gas before entry into the scrubbing apparatus.

Fluid connection between two regions is to be understood as meaning any type of connection whatsoever which makes it possible that a fluid, for example the liquid scrubbing medium, can flow from the one to the other of the two regions, neglecting any interposed regions, component parts, valves or apparatuses.

Means for providing, supplying or discharging material streams to or from process stages or plant parts are to be understood as meaning all apparatuses, component parts and devices which a person skilled in the art would consider utilizing in the particular situation, in particular reservoir vessels, conduits, isolating and metering apparatuses such as for example valves, conveying apparatuses such as for example pumps, blowers, compressors.

Any pressure figures in the unit bar(a) are based on the absolute pressure in bar absolute, unless stated otherwise in the individual case.

The inventors have recognized that it is advantageous to subject a portion of the crude synthesis gas to a CO conversion in the form of a crude gas CO shift. The shifted crude synthesis gas and the unshifted crude synthesis gas are subsequently treated in two separate gas scrubbing apparatuses. It is advantageous that the same plant constituents and apparatuses may be used in respect of the regeneration of the laden scrubbing media since these are necessarily present even in case of treatment of only one crude synthesis gas. As a result corresponding synergies are gained in the treatment of two different crude synthesis gases having different compositions.

Appropriate combination of the shifted pure synthesis gas and the unshifted pure synthesis gas makes it possible to obtain different end product streams, for example a methanol synthesis gas product stream having the $H_2/CO$ ratio required for methanol synthesis, a hydrogen product stream and a fuel gas product stream. This affords advantages in respect of the breadth of the product palette compared to a process where only a single crude synthesis gas of fixed composition is processed.

The invention is further based on the finding that the obtained flash gases may also be utilized materially by recycling into the crude synthesis gas entering into the gas scrubbing process. The flash gases still contain proportions of the value components CO and $H_2$ and as a result of the inventive recycling to the shifted/unshifted crude synthesis gas can likewise pass at least partially into the synthesis gas partial product streams. This improves the overall balance of the process for these value components.

In a specific embodiment of the process according to the invention according to Claim 2 and of the plant according to the invention according to Claim 10, only a portion of the flash gases is utilized materially by recycling into the crude synthesis gas entering into the gas scrubbing process while another portion is passed to an expander, for example a multi-stage decompression turbine. This achieves an advantageous compromise between utilization of the flash gases materially and energetically.

Further Preferred Embodiments of the Invention

A preferred embodiment of the process according to the invention is characterized in that the scrubbing medium comprises one or more components selected from the group of: methanol, N-methylpyrrolidone (NMP), secondary amines, preferably diethanolamine, tertiary amines, preferably methyldiethanolamine, polyethylene glycol dialkyl ethers, preferably polyethylene glycol dimethylether. All of these absorption media are used for absorption of carbon dioxide and sulfur compounds, are chemically stable and chemically inert toward the substances to be separated and may be regenerated by decompression/hot regeneration.

A further preferred embodiment of the process according to the invention is characterized in that the first and/or the third synthesis gas partial product stream are at least partially added to a methanol synthesis gas product stream or form a methanol synthesis gas product stream.

It is particularly preferable when the first and the third synthesis gas partial product stream are at least partially added to a methanol synthesis gas product stream, wherein the particular proportion is chosen such that the $H_2/CO$ ratio required for methanol synthesis is established. Since the first partial product stream derives from the unshifted crude synthesis gas and the third partial product stream derives from the shifted crude synthesis gas and the latter is thus richer in hydrogen, appropriate combination of both streams can be undertaken to precisely establish the $H_2/CO$ ratio desired for methanol synthesis.

A further preferred embodiment of the process according to the invention is characterized in that the second expanded synthesis gas partial product stream is added to a fuel gas product stream or forms a fuel gas product stream.

It is preferable when the fourth synthesis gas partial product stream is added to a hydrogen product stream or forms a hydrogen product stream. The first partial product stream derives from the shifted crude synthesis gas and is thus richer in hydrogen compared to unshifted synthesis gas.

It has proven particularly advantageous when the recompressor is a multi-stage recompressor, wherein the gaseous tops products from the low-pressure flash vessels are supplied to the first stage and the gaseous tops products from the intermediate-pressure flash vessels are supplied to a subsequent stage of the multi-stage recompressor. In this way the flash gases are compressed in energetically optimized fashion since they are supplied to the corresponding stage of the multi-stage recompressor having a similar pressure level.

BRIEF DESCRIPTION OF THE DRAWINGS

Further features, advantages and possible applications of the invention are also apparent from the description of working examples which follows and the drawings. All the features described and/or depicted, on their own or in any combination, form the subject-matter of the invention, irrespective of their combination in the claims or their dependency references.

DETAILED DESCRIPTION OF PREFERRED EMBODIMENTS

Figure 1:
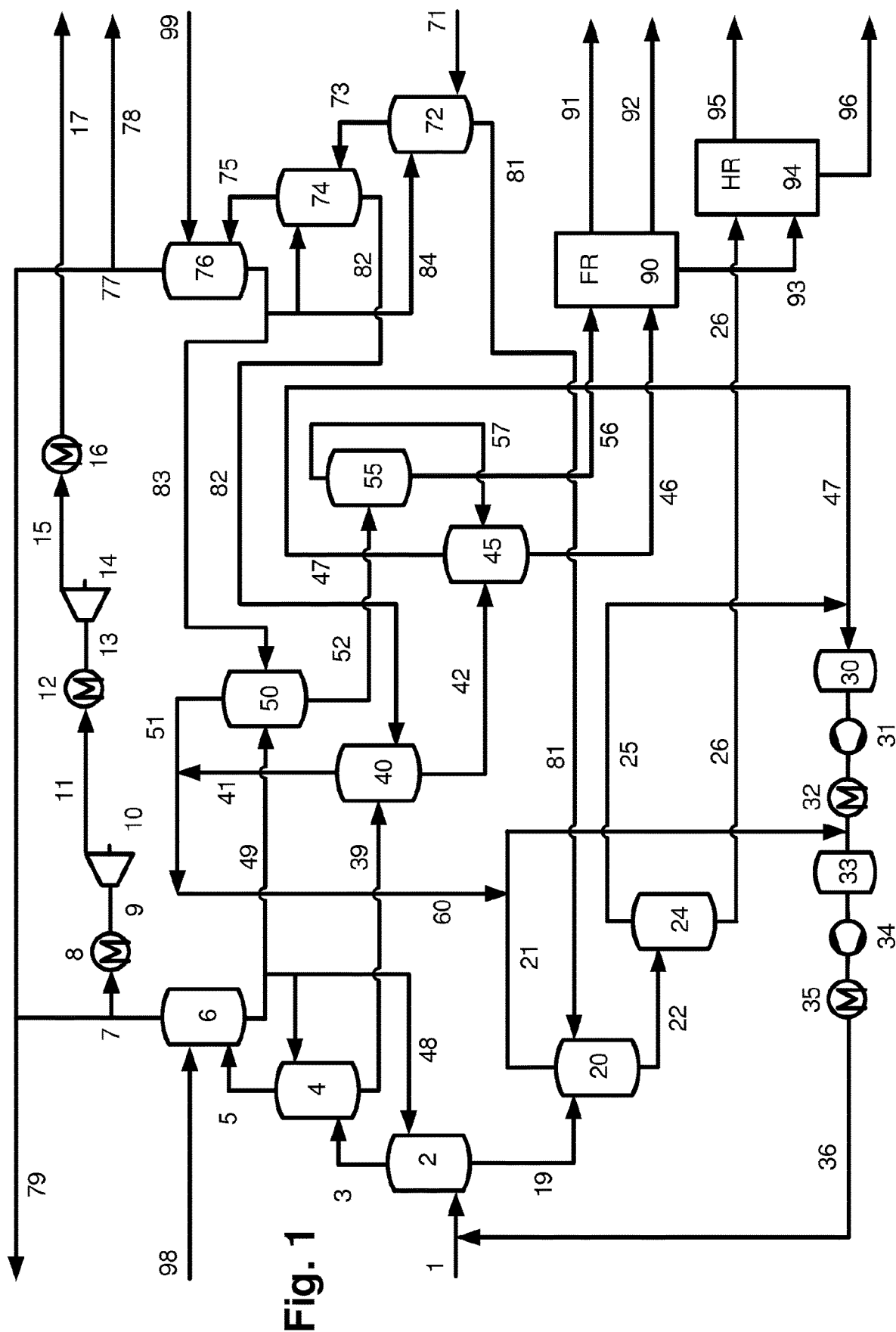
FIG. 1 shows a schematic diagram of the process according to the invention/of the plant according to the invention in a first embodiment.

In the schematic diagram shown in FIG. 1 of the process according to the invention/of the plant according to the invention according to a first embodiment unshifted crude synthesis gas is supplied via conduit 1 and shifted crude synthesis gas is supplied via conduit 71 to two separate scrubbing apparatuses comprising the scrubbers 2, 4 and 6 and 72, 74 and 76 respectively. The individual scrubbers may be separate devices or else regions of an integrated scrubbing/absorption column. The scrubbing medium employed in the present working example is cold methanol which is passed to the scrubbing apparatuses via conduits 98/99. Usually a plurality of methanol streams of different degrees of purity/regeneration are supplied to the scrubbing apparatus at various points in a manner known to those skilled in the art (not shown).

Via conduit 1 the unshifted crude synthesis gas enters the prescrubber 2 for removal of trace components such as $NH_3$ and HCN with a typical pressure of 20 to 70 bar(a) and is therein scrubbed with methanol partially laden with acidic gas constituents which is supplied via conduit 48. Via conduit 3 the tops product from the prescrubber 2 is supplied to the $H_2S$ scrubber 4 and therein likewise scrubbed with partially laden methanol. The tops product from the $H_2S$ scrubber 4 is supplied via conduit 5 to the $CO_2$ scrubber 6 and therein scrubbed with methanol of high-purity which is supplied via conduit 98 and is formed by hot-regenerated methanol, fresh pure methanol or mixtures thereof. Via conduit 7 a portion of the tops product from the $CO_2$ scrubber 6 is supplied to an expander in the form of a two-stage decompression turbine comprising the coolers 8, 12, 16, the turbine stages 10, 14 and the internal conduits 9, 11, 13, 15. Therein the purified synthesis gas is decompressed to a pressure of typically 5 bar(a), thus recovering refrigeration and mechanical work. Condensate separators are typically present after each decompression stage but are not shown. Condensate collected here is recycled to a part of the plant in which liquids are processed at similar pressure; these are the flash vessels for example. Via conduit 17 the decompressed pure synthesis gas is discharged from the process and sent for further treatment or processing. The thus-obtained pure synthesis gas may be utilized as fuel gas for example. Via conduit 7 and, after combination with the gas supplied via conduit 77, via conduit 79 the remaining portion of the tops product from the $CO_2$ scrubber for the unshifted crude synthesis gas 6 is discharged from the process as methanol synthesis gas.

Via conduit 71 the shifted crude synthesis gas enters the prescrubber 72 for removal of trace components such as $NH_3$ and HCN with a typical pressure of 20 to 70 bar(a) and is therein scrubbed with methanol partially laden with acidic gas constituents which is supplied via conduit 84. Via conduit 73 the tops product from the prescrubber 72 is supplied to the $H_2S$ scrubber 74 and therein likewise scrubbed with partially laden methanol. The tops product from the $H_2S$ scrubber 74 is supplied via conduit 75 to the $CO_2$ scrubber 76 and therein scrubbed with methanol of high-purity which is supplied via conduit 99 and is formed by hot-regenerated methanol, fresh pure methanol or mixtures thereof. The tops product from the $CO_2$ scrubber 76 is discharged via conduit 77 and divided into two portions. Via conduit 78 a first portion is discharged from the process as a crude hydrogen product and sent for further processing/treatment (not shown). A second portion is discharged via conduit 77 and combined with the remaining proportion of the tops product from the $CO_2$ scrubber 6 and discharged from the process via conduit 79.

The methanol scrubbing medium laden with trace components such as $NH_3$ and HCN in the prescrubbers 2, 72 is supplied via conduits 19, 81 to the intermediate-pressure prescrubbing flash vessel 20 and therein decompressed to typically 15 to 40 bar(a). The thus-obtained gaseous tops product is passed via conduit 21 to the second stage of a recompressor which comprises the coolers 32, 35, the compressor stages 31, 34 and the separators 30, 33. Conduits inside the recompressor have not been marked with dedicated reference numerals. The liquid bottoms product from the intermediate-pressure prescrubbing flash vessel 20 is passed via conduit 22 to a low-pressure prescrubbing flash vessel 24 and therein decompressed to typically 1.5 to 15 bar(a). The thus-obtained gaseous tops product is passed via conduit 25 to the first stage of the recompressor and therein introduced into the separator 30. The liquid bottoms product from the low-pressure prescrubbing flash vessel 24 is passed via conduit 26 to a hot regeneration apparatus 94.

The methanol scrubbing medium laden with hydrogen sulfide in the $H_2S$ scrubbers 4, 74 is supplied via conduits 39, 82 to an intermediate-pressure $H_2S$ flash vessel 40 and therein decompressed to typically 15 to 40 bar(a). The thus-obtained gaseous tops product is passed via conduits 41, 51, 60 and 21 to the second stage of the recompressor. The liquid bottoms product from the intermediate-pressure $H_2S$ flash vessel 40 is passed via conduit 42 to a low-pressure $H_2S$ flash vessel 45 and therein decompressed to typically 1.5 to 15 bar(a). The thus-obtained gaseous tops product is passed via conduit 47 to the first stage of the recompressor and therein introduced into the separator 30. The liquid bottoms product from the low-pressure $H_2S$ flash vessel 45 is passed via conduit 46 to a flash regeneration apparatus 90.

The methanol scrubbing medium laden with carbon dioxide in the $CO_2$ scrubbers 6, 76 is supplied via conduits 49, 83 to an intermediate-pressure $CO_2$ flash vessel 50 and therein decompressed to typically 15 to 40 bar(a). The thus-obtained gaseous tops product is passed via conduits 51, 60 and 21 to the second stage of the recompressor. The liquid bottoms product from the intermediate-pressure $CO_2$ flash vessel 50 is passed via conduit 52 to a low-pressure $CO_2$ flash vessel 55 and therein decompressed to typically 1.5 to 15 bar(a). The thus-obtained gaseous tops product is passed via conduit 57 to the low-pressure $H_2S$ flash vessel 45 and therein combined with the tops product therefrom. The liquid bottoms product from the low-pressure $CO_2$ flash vessel 55 is passed via conduit 56 to the flash regeneration apparatus 90.

The gas streams entering into the two-stage recompressor are in two pressure stages compressed to the pressure level of the crude synthesis gas and via conduits 36 and 1 recycled to the prescrubber 2. It is also possible for conduit 36 to pass directly into the prescrubber 2.

The laden methanol scrubbing medium introduced into the flash regeneration apparatus 90 is decompressed therein. The decompression is carried out in a plurality of stages (not shown) and finally a $CO_2$ product stream of high $CO_2$ purity and a $CO_2$ exhaust gas stream of lower $CO_2$ purity are obtained and discharged from the process via conduits 91 and 92. The procedure required here and the employed pressure stages are known per se to those skilled in the art. Also obtained is a methanol scrubbing medium laden essentially with hydrogen sulfide which is passed via conduit 93 to the hot regeneration apparatus 94. This too is a multi-stage apparatus (shown only schematically) and the individual process steps and process conditions of the hot regeneration are known to those skilled in the art. Obtained as the product of the hot regeneration is a methanol scrubbing medium stream of high purity (so-called fine scrubbing methanol) which—optionally after further treatment steps and with addition of fresh methanol—is recycled via conduits 98, 99 to the $CO_2$ scrubbers 6, 76. Also obtained as a further product of the hot regeneration is an acidic gas stream which contains hydrogen sulfide and further sulfur components and via conduit 95 is discharged from the process and sent for further treatment or processing. The acidic gas stream is typically supplied to a sulfur recovery plant operating according to the Claus process for example (not shown).

Figure 2:
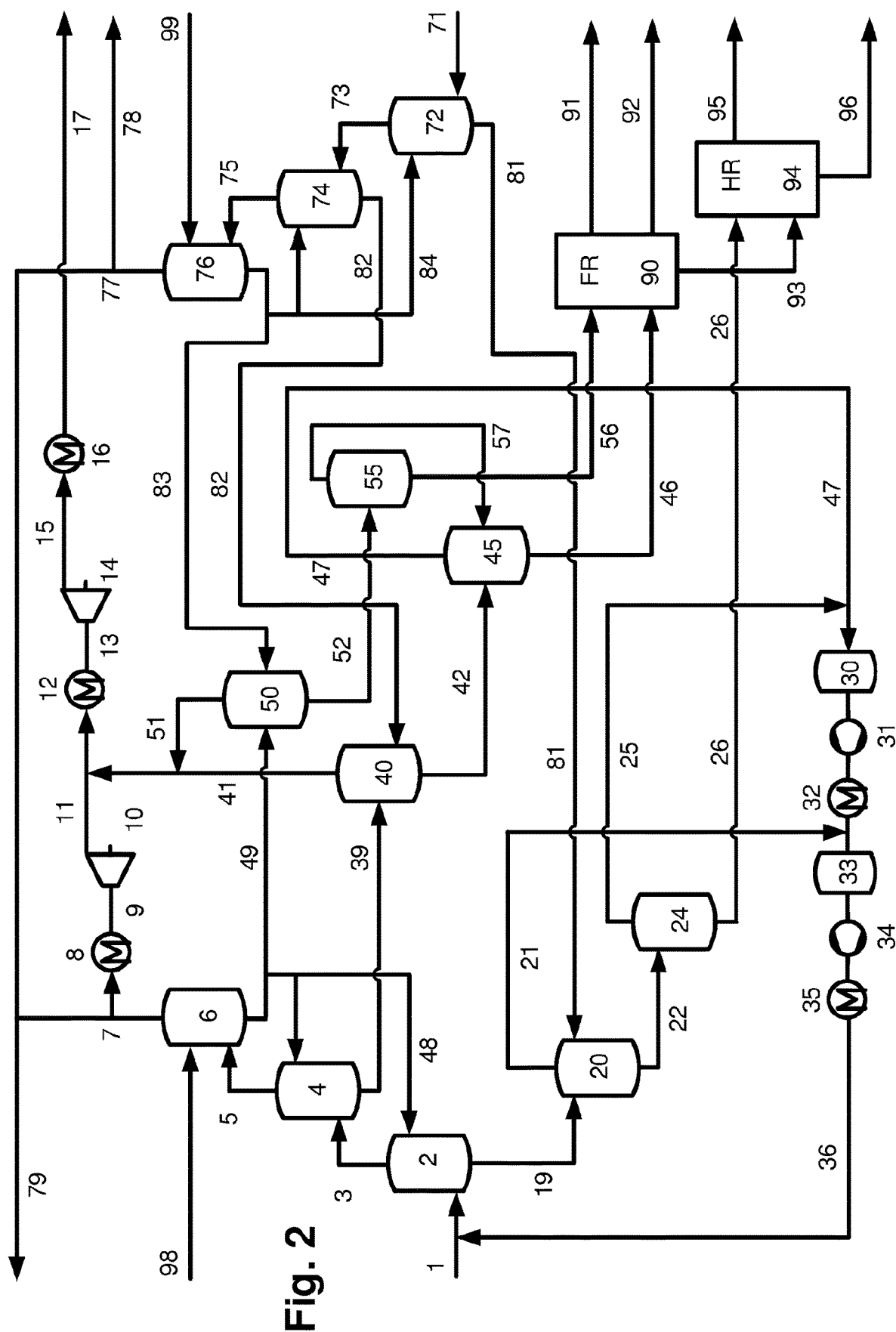
FIG. 2 shows a schematic diagram of the process according to the invention/of the plant according to the invention in a second embodiment.

The schematic representation of the process according to the invention/of the plant according to the invention in a second embodiment shown in FIG. 2 corresponds largely to the embodiment of FIG. 1. In contrast to the latter, the tops products from the intermediate-pressure $H_2S$ flash vessel 40 and from the intermediate-pressure $CO_2$ flash vessel 50 are passed via conduits 41 and 51 to the second stage of the two-stage expander. Accordingly, in this specific embodiment only a portion of the flash gases from the intermediate-pressure $H_2S$ flash vessel and the intermediate-pressure $CO_2$ flash vessel is utilized materially by recompressing and recycling to the crude synthesis gas entering into the gas scrubbing process while the remaining proportion of the flash gases is used for recovery of refrigeration and mechanical work and is thus utilized energetically. This achieves an advantageous compromise between utilization of the flash gases materially and energetically.

INDUSTRIAL APPLICABILITY

The invention provides a gas scrubbing process and a corresponding plant for removal of acidic gas constituents from crude synthesis gas which make it possible by treatment of shifted and of unshifted crude synthesis gas in the gas scrubbing process and by combination of the thus-obtained partial product streams to produce a plurality of gas products having different compositions. In addition, the invention ensures that the flash gases obtained during decompression of the laden scrubbing medium are utilized materially and/or energetically in advantageous fashion.

LIST OF REFERENCE NUMERALS

1 Conduit
2 Prescrubber
3 Conduit
4 $H_2S$ scrubber
5 Conduit
6 $CO_2$ scrubber
7 Conduit
8 Cooler
9 Conduit
10 Turbine stage
11 Conduit
12 Cooler
13 Conduit
14 Turbine stage
15 Conduit
16 Cooler
17 Conduit
19 Conduit
20 Intermediate-pressure prescrubbing flash vessel
21 Conduit
22 Conduit
24 Low-pressure prescrubbing flash vessel
25 Conduit
26 Conduit
30 Separator
31 Compressor stage
32 Cooler
33 Separator
34 Compressor stage
35 Cooler
36 Conduit
39 Conduit
40 Intermediate-pressure $H_2S$ flash vessel
41 Conduit
42 Conduit
45 Low-pressure $H_2S$ flash vessel
46 Conduit
47 Conduit
49 Conduit
50 Intermediate-pressure $CO_2$ flash vessel
51 Conduit
52 Conduit
55 Low-pressure $CO_2$ flash vessel
56 Conduit
57 Conduit
60 Conduit
71 Conduit
72 Prescrubber 73 Conduit
74 H$_2$S scrubber
75 Conduit
76 CO$_2$ scrubber
77 Conduit
78 Conduit
79 Conduit
81 Conduit
82 Conduit
83 Conduit
84 Conduit
90 Flash regeneration apparatus
91 Conduit
92 Conduit
93 Conduit
94 Hot regeneration apparatus
95 Conduit
96 Conduit
98 Conduit
99 Conduit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for purifying a shifted crude synthesis gas and an unshifted crude synthesis gas by gas scrubbing with a scrubbing medium and for producing a plurality of synthesis gas product streams having different H$_2$/CO ratios comprising:
   (a) providing and supplying the shifted crude synthesis gas and the unshifted crude synthesis gas to respective separate prescrubbers for removal of trace components
   (b) supplying the gaseous tops products from the prescrubbers to respective separate H$_2$S scrubbers for removal of H$_2$S,
   (c) supplying the gaseous tops products from the H$_2$S scrubbers to respective separate CO$_2$ scrubbers for removal of CO$_2$,
   (d1) dividing the gaseous tops product stream from the CO$_2$ scrubber for the unshifted crude synthesis gas into a first synthesis gas partial product stream and into a second synthesis gas partial product stream which for pressure reduction is passed through a multi-stage expander to recover mechanical work and refrigeration and to obtain an expanded second synthesis gas partial product stream,
   (d2) dividing the gaseous tops product stream from the CO$_2$ scrubber for the shifted crude synthesis gas into a third synthesis gas partial product stream and into a fourth synthesis gas partial product stream,
   (e) supplying the liquid bottoms products from the separate prescrubbers to an intermediate-pressure prescrubbing flash vessel, supplying the gaseous tops product from the intermediate-pressure prescrubbing flash vessel to a recompressor, supplying the liquid bottoms product from the intermediate-pressure prescrubbing flash vessel to a low-pressure prescrubbing flash vessel, supplying the gaseous tops product from the low-pressure prescrubbing flash vessel to the recompressor, supplying the liquid bottoms product from the low-pressure prescrubbing flash vessel to at least one apparatus for flash regeneration and/or hot regeneration of the scrubbing medium,
   (f) supplying the liquid bottoms products from the separate H$_2$S scrubbers to an intermediate-pressure H$_2$S flash vessel, supplying the gaseous tops product from the intermediate-pressure H$_2$S flash vessel to the recompressor, supplying the liquid bottoms product from the intermediate-pressure H$_2$S flash vessel to a low-pressure H$_2$S flash vessel, supplying the gaseous tops product from the low-pressure H$_2$S flash vessel to the recompressor, supplying the liquid bottoms product from the low-pressure H$_2$S flash vessel to at least one apparatus for flash regeneration and/or hot regeneration of the scrubbing medium,
   (g) supplying the liquid bottoms products from the separate CO$_2$ scrubbers to an intermediate-pressure CO$_2$ flash vessel, supplying the gaseous tops product from the intermediate-pressure CO$_2$ flash vessel to the recompressor, supplying the liquid bottoms product from the intermediate-pressure CO$_2$ flash vessel to a low-pressure CO$_2$ flash vessel, supplying the gaseous tops product from the low-pressure CO$_2$ flash vessel to the low-pressure H$_2$S flash vessel and/or to the recompressor, supplying the liquid bottoms product from the low-pressure CO$_2$ flash vessel to at least one apparatus for flash regeneration and/or hot regeneration of the scrubbing medium, and
   (h) recycling the gas stream compressed by the recompressor to the prescrubber for the unshifted crude synthesis gas and/or the shifted crude synthesis gas.

2. The process according to claim 1, wherein the scrubbing medium comprises one or more components selected from the group consisting of: methanol, N-methylpyrrolidone (NMP), secondary amines, tertiary amines, and polyethylene glycol dialkyl ethers polyethylene glycol dimethyl ether.

3. The process according to claim 1, wherein the first and/or the third synthesis gas partial product stream are at least partially added to a methanol synthesis gas product stream or form a methanol synthesis gas product stream.

4. The process according to claim 3, wherein the first and the third synthesis gas partial product stream are at least partially added to a methanol synthesis gas product stream, wherein the particular proportion is chosen such that the H$_2$/CO ratio required for methanol synthesis is established.

5. The process according to claim 1, wherein the second expanded synthesis gas partial product stream is added to a fuel gas product stream or forms a fuel gas product stream.

6. The process according to claim 1, wherein the fourth synthesis gas partial product stream is added to a hydrogen product stream or forms a hydrogen product stream.

7. The process according to claim 1, wherein the recompressor is a multi-stage recompressor, wherein the gaseous tops products from the low-pressure flash vessels are supplied to the first stage and the gaseous tops products from the intermediate-pressure flash vessels are supplied to a subsequent stage of the multi-stage recompressor.

* * * * *